United States Patent
Jeong et al.

(10) Patent No.: US 9,100,901 B2
(45) Date of Patent: Aug. 4, 2015

(54) APPARATUS AND METHOD FOR INITIAL ACCESS IN WIRELESS COMMUNICATION SYSTEM WITH HIERARCHICAL CELL STRUCTURE

(75) Inventors: Su-Ryong Jeong, Yongin-si (KR); Seung-Hoon Choi, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 571 days.

(21) Appl. No.: 13/399,766

(22) Filed: Feb. 17, 2012

(65) Prior Publication Data

US 2012/0213171 A1    Aug. 23, 2012

(30) Foreign Application Priority Data

Feb. 18, 2011   (KR) .................. 10-2011-0014389

(51) Int. Cl.
*H04W 48/16* (2009.01)
*H04W 84/04* (2009.01)

(52) U.S. Cl.
CPC ............ *H04W 48/16* (2013.01); *H04W 84/045* (2013.01)

(58) Field of Classification Search
CPC ..... H04W 76/00; H04W 76/02; H04W 60/00; H04W 60/005; H04W 60/02; H04W 60/04; H04W 36/14; H04W 36/30; H04W 36/16; H04W 36/18
USPC .............. 370/310, 328, 329, 338; 455/422.1, 455/435.1, 435.2, 436, 437, 438, 439
See application file for complete search history.

(56) References Cited

U.S. PATENT DOCUMENTS

| | | | | |
|---|---|---|---|---|
| 8,577,397 | B2 * | 11/2013 | Takechi | 455/458 |
| 2010/0227627 | A1 * | 9/2010 | Ishii et al. | 455/456.2 |
| 2010/0291938 | A1 * | 11/2010 | Jang | 455/450 |
| 2011/0201311 | A1 * | 8/2011 | Lee et al. | 455/411 |
| 2011/0244870 | A1 * | 10/2011 | Lee | 455/444 |
| 2012/0258743 | A1 * | 10/2012 | Kurokawa et al. | 455/466 |

FOREIGN PATENT DOCUMENTS

JP    2010114698 A  *  5/2010

* cited by examiner

*Primary Examiner* — Chi H Pham
*Assistant Examiner* — Weibin Huang

(57) ABSTRACT

An initial access procedure in a wireless communication of a hierarchical cell structure includes operations of a mobile station (MS). The operations of the MS include transmitting an initial access message; obtaining information of a small cell Base Station (BS) which receives the initial access message, from a response message received from a macro BS; attempting to decode a reference channel transmitted by the small cell BS; and when successfully decoding the reference channel, setting a downlink channel with the small cell BS.

28 Claims, 11 Drawing Sheets

APPARATUS AND METHOD FOR INITIAL ACCESS IN WIRELESS COMMUNICATION SYSTEM WITH HIERARCHICAL CELL STRUCTURE

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Feb. 18, 2011 and assigned Serial No. 10-2011-0014389, the entire disclosure of which is hereby incorporated by reference.

TECHNICAL FIELD OF THE INVENTION

The present disclosure relates generally to a wireless communication system.

BACKGROUND OF THE INVENTION

In conventional wireless communication systems, a single Base Station (BS) services Mobile Stations (MSs) in a certain area. However, as demand for a data service rapidly grows, it is necessary to develop techniques of higher transmission efficiency and transfer rate.

In response to such a demand, an advanced mobile communication system ensures additional transmission resources via a heterogeneous network which maintains the existing cellular coverage and additionally installs various BSs, and makes an effort to achieve high transmission efficiency by applying small cell technology for servicing a narrow area against the existing cellular environment. In connection with the heterogeneous network and the small cell technology, researches are conducted to enhance frequency utilization and to lower power consumption by adopting the small cell technology using the additional frequency resource with the existing macrocell maintained, Further, researches are conducted to minimize overhead and to maximize the transmission efficiency by reusing some control channels including a synchronization channel of the existing macrocell in the additional small cell.

However, when the synchronization channel of the existing macrocell is reused in the additional small cell, the overhead can be reduced and the data rate can increase. Disadvantageously, it is hard for the legacy MS to detect the small cell and to carry out the synchronization. Thus, when the small cell does not have the synchronization channel or the legacy MS cannot recognize the synchronization channel by itself, what is needed is a solution enabling the MS to detect the small cell and to communicate using the small cell.

SUMMARY OF THE INVENTION

To address the above-discussed deficiencies of the prior art, it is a primary aspect of the present disclosure to provide an apparatus and a method for supporting a new system to satisfy user's demand in a wireless communication system.

Another aspect of the present disclosure is to provide an apparatus and a method for supporting a system of a hierarchical cell structure in a wireless communication system.

Yet another aspect of the present disclosure is to provide an apparatus and a method for supporting a system including a small cell in a wireless communication system.

Still another aspect of the present disclosure is to provide an apparatus and a method for supporting a distributed antenna structure in a wireless communication system.

A further aspect of the present disclosure is to provide an apparatus and a method for performing an initial access procedure optimized for a small cell structure in a wireless communication system.

According to one aspect of the present disclosure, an operating method of a Mobile Station (MS) in a wireless communication system includes transmitting an initial access message; obtaining information of a small cell Base Station (BS) which receives the initial access message, from a response message received from a macro BS; attempting to decode a reference channel transmitted by the small cell BS; and when successfully decoding the reference channel, setting a downlink channel with the small cell BS.

According to another aspect of the present disclosure, an operating method of a small cell BS in a wireless communication system includes when receiving an initial access message from an MS, reporting an initial access trial of the MS to a macro BS; transmitting a reference channel signal to determine whether to provide a downlink channel to the MS over a reference channel; and when receiving a reference channel Acknowledge (ACK) from the MS, setting the downlink channel of the MS.

According to yet another aspect of the present disclosure, an operating method of a macro BS in a wireless communication system includes periodically transmitting a synchronization signal and system information; determining whether a small cell BS reports an initial access trial of an MS; and transmitting a response message comprising information of the small cell.

According to still another aspect of the present disclosure, an apparatus of an MS in a wireless communication system includes a modem for transmitting, an initial access message; and a controller for obtaining information of a small cell BS which receives the initial access message, from a response message received from a macro BS, attempting to decode a reference channel transmitted by the small cell BS, and when successfully decoding the reference channel, setting a downlink channel with the small cell BS.

According to a further aspect of the present disclosure, an apparatus of a small cell BS in a wireless communication system includes a backhaul communication unit for, when receiving an initial access message from an MS, transmitting a report of an initial access trial of the MS to a macro BS; a modem for transmitting a reference channel signal to determine whether to provide a downlink channel to the MS over a reference channel; and a controller for, when receiving a reference channel ACK from the MS, setting the downlink channel of the MS.

According to a further aspect of the present disclosure, an apparatus of a macro BS in a wireless communication system includes a modem for periodically transmitting a synchronization signal and system information; and a controller for determining whether a small cell BS reports an initial access trial of an MS, and controlling to transmit a response message comprising information of the small cell.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present disclosure relates to an apparatus and a method for initial access in a wireless communication system of a hierarchical cell structure. Exemplary embodiments of the present disclosure provide a hierarchical cell structure and an initial access procedure optimized for the hierarchical cell structure in a wireless communication system. Hereinafter, a wireless communication system based on Orthogonal Frequency Division Multiplexing (OFDM)/Orthogonal Frequency Division Multiple Access (OFDMA) is explained by way of example. To ease the understanding, terms defined in, but not limited to, Institute of Electrical and Electronics Engineers (IEEE) 802.16m standard are used. Yet, the present disclosure is equally applicable to other systems.

Figure 1:
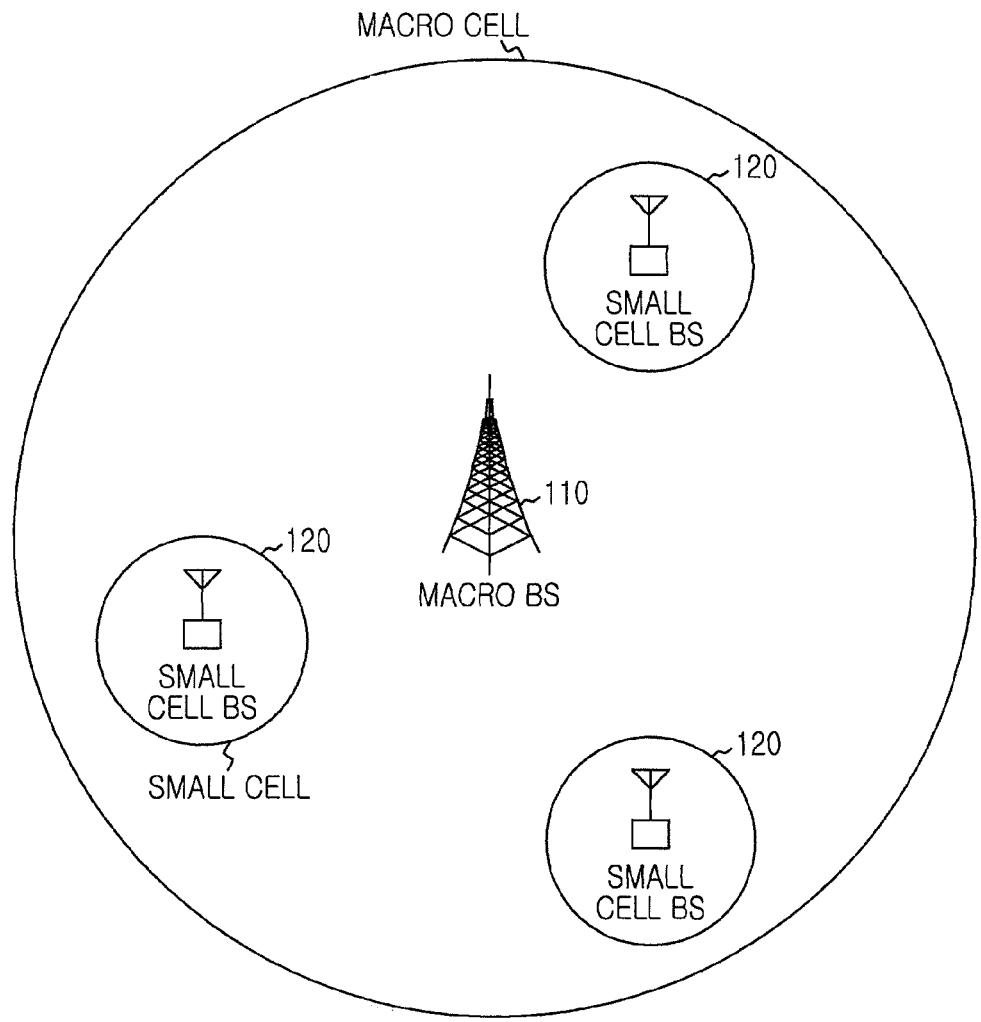
FIG. 1 illustrates a simplified structure of a wireless communication system according to an exemplary embodiment of the present disclosure.

FIG. 1 depicts a simplified structure of a wireless communication system according to an exemplary embodiment of the present disclosure.

Referring to FIG. 1, a macro Base Station (BS) 110 resides in a macrocell. A plurality of small cell BSs 120 is installed at different locations in the macrocell. The small cell BSs 120 transmit and receive signals to and from Mobile Stations (MSs) traveling in their small cells. The small cell can be referred to as a hot spot area. The small cell BSs 120 can transmit and receive different signals at the same time. In the structure of FIG. 1, the system can provide good channel quality throughout the cell. While each small cell BS 120 includes the single antenna in FIG. 1, the small cell BSs 120 each can include a plurality of antennas.

Figure 2:
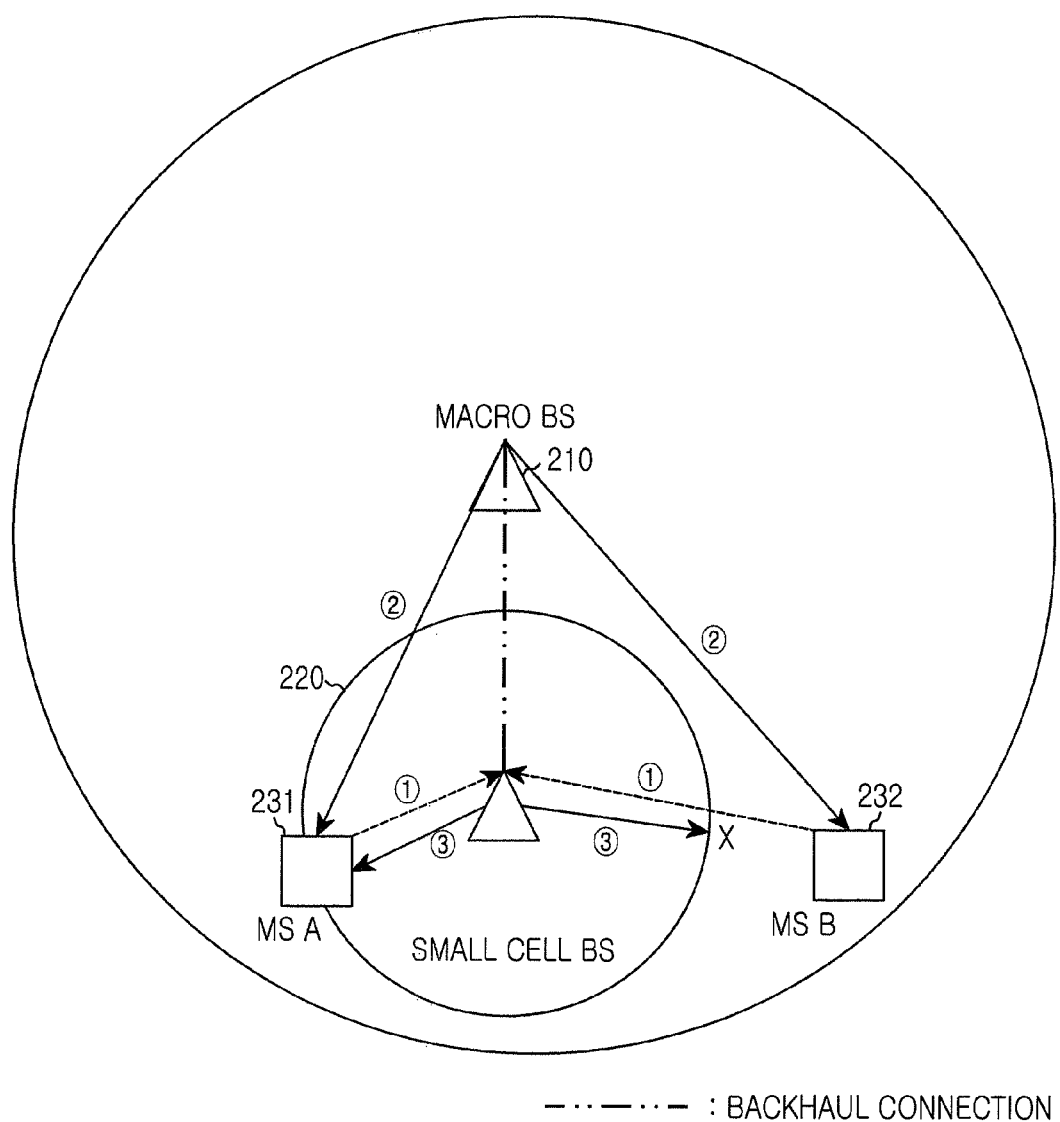
FIG. 2 illustrates situations considered in the wireless communication system according to an exemplary embodiment of the present disclosure.

In the system environment including the small cells within the macrocell as shown in FIG. 1, the present disclosure considers situations of FIG. 2. FIG. 2 depicts situations considered in the wireless communication system according to an exemplary embodiment of the present disclosure. Referring to FIG. 2, a macro BS 210 and a small cell BS 220 are connected via the backhaul. Accordingly, the macro BS 210 and the small cell BS 220 can exchange information instantly. An MS A 231 and an MS B 232 can receive a downlink synchronization channel of the macro BS 210. The MS A 231 and the MS B 232 always transmit an initial access message destined for the macro BS 210, regardless of their locations in the cell of the small cell BS 220.

The MS A 231 and the MS B 232 travel in the cell of the macro BS 210. Since the MS A 231 and the MS B 232 are relatively closer to the small cell BS 220 than the macro BS 210, it is assumed that a reception time of the signal from the small cell BS 220 and a signal channel quality are better. Yet, the MS A 231 travels in the cell of the small cell BS 220, and the MS B 232 travels outside the cell of the small cell BS 220. Naturally, the MS A 231 can receive the signal from the small cell BS 220, and the MS B 232 cannot receive the signal from the small cell BS 220. This is because the service coverage of the small cell BS 220 is smaller than that of the macro BS 210 and thus the transmit power of the former is smaller than the latter.

In this environment, it is assumed that the small cell BS 220 does not have the synchronization channel or the legacy MS cannot recognize the synchronization channel of the small cell BS 220. Hence, although the MS A 231 and the MS B 232 of FIG. 2 are relatively closer to the small cell BS 220 than the macro BS 210, they cannot recognize the small cell BS 220 by themselves.

When the MS A 231 or the MS B 232 transmits an uplink signal, the small cell BS 220 which is relatively closer can receive the uplink signal with the better channel quality faster than the macro BS 210. Since the macro BS 210 and the small cell BS 220 are interrelated, the closer or more advantageous BS can be identified based on the initial signal reception time and the receive signal quality of the uplink signal. However, since the small cell BS 220 has the narrower service coverage and the lower transmit power than the macro BS 210, the macro BS 210 and the small cell BS 220 cannot make sure whether the MS A 231 and the MS B 232 can receive the downlink signal of the small cell BS 220. As a result, it is difficult to select the BS for transmitting downlink data.

Still referring to FIG. 2, since the MS A 231 and the MS B 232 are closer to the small cell BS 220 than the macro BS 210, the quicker signal reception time and the better receive channel quality are expected for the small cell BS 220. Yet, the MS capable of receiving the downlink signal of the small cell BS 220 is only the MS A 231 traveling within the cell coverage of the small cell BS 220 in FIG. 2, and the MS B 232 needs to receive the downlink signal from the macro BS 210.

Thus, when there is no synchronization channel for the signal transmitted by the small cell BS or when the legacy MSs cannot recognize the synchronization channel of the small cell BS themselves, the present disclosure provides an apparatus and a method for selecting the BS including the small cell BS to receive the downlink data.

The BS can be selected as below.

In the first step, since the MS A 231 and the MS B 232 cannot recognize the small cell BS 220 during the initial access procedure by themselves, they transmit the initial access message toward the existing macrocell as in the related art. The MS A 231 and the MS B 232 attempting the initial access cannot know a distance to the macro BS 210, and thus repeatedly transmit the initial access message by gradually increasing the power from the low power. The MS A 231 and the MS B 232 are closer to the small cell BS 220 than the macro BS 210 as shown in FIG. 2. Hence, before the macro BS 210, the small cell BS 220 first receives the initial access messages of the MS A 231 and the MS B 232, and notifies the initial access messages to the macro BS 210. In so doing, the small cell BS 220 measures correction values of timing and frequency offsets and a correction value of the receive power, and then notifies the correction values together with the initial access messages.

In the second step, the macro BS 210 receiving the reception notification of the correction values of the timing, the frequency, and the power, and the initial access messages from the small cell BS 220, recognizes that the small cell BS 220 receives the corresponding signal faster with the better channel quality than the macro BS's 210 received signal. That is, the macro BS 210 determines that the corresponding MS is closer to the small cell BS 220. Accordingly, the macro BS 210 transmits to the MS A 231 and the MS B 232, the correction values of the timing, the frequency, and the power correction values notified from the small cell BS 220 together with identification information of the small cell BS 220, and also transmission time information and location (e.g., frequency and channel index) information of a reference channel to be transmitted by the small cell BS 220. When the reception of the reference channel transmitted by the small cell BS 220 succeeds or fails, the macro BS 210 can also transmit tinting and location (e.g., frequency and channel index) information of a feedback channel for carrying a response; that is, for carrying Acknowledge (ACK)/Non-ACK (NACK). In addition, separately from the correction values of the timing, the frequency, and the power determined by the small cell BS 220, the macro BS 210 can transmit the macro BS 210 measured timing, frequency, and power correction values.

The reference channel is a control channel transmitted by the small cell BS 220 to determine whether the MS traveling in the cell of the macro BS 210 can receive the downlink signal of the small cell BS 220. A signal transmitted over the reference channel can include channel information required to communicate with the small cell BS 220 including characteristic and system parameters of the small cell BS 220 and location information of the control channels of the small cell BS 220. In general, such information is transmitted over a broadcast channel according to a certain cycle. However, the small cell supports only a limited number of MSs because of low mobility of the MS and the narrow service area. Hence, the small cell BS 220 may uncast such information only in the initial access of the MS. Still, the small cell BS 220 can broadcast the information besides the unicast.

As stated above, when the reference channel reception of the small cell BS 220 succeeds or fails, the timing and location information (e.g., frequency and channel index) information of the feedback channel for delivering the response of the success or the failure is transmitted. The feedback channel may carry the response signal (e.g., ACK/NACK) by using the channel transmitted to the small cell BS 220. Alternatively, the response message can be transmitted to the macro BS 210, which is not depicted in FIGS. 3 and 4. The ACK indicating the successful reception of the reference channel can be transmitted to the small cell BS 220, and the NACK indicating the reception failure of the reference channel can be transmitted to the macro BS 210, which is not depicted in FIGS. 3 and 4.

In the third step, the small cell BS 220 transmits a signal over the reference channel. Hence, the MS A 231 and the MS B 232 attempt to decode the reference channel of the small cell BS 220. In so doing, the MS A 231, which travels in the small cell, succeeds in decoding the reference channel. By contrast, the MS B 232, which travels outside the small cell, fails to decode the reference channel. Accordingly, the downlink channel of the MS A 231 is established with the small cell BS 220, and the downlink channel of the MS B 232 is established with the macro BS 210. The MS A 231 and the MS B 232 can report the reference channel decoding success or failure to the macro BS 210. The information of the feedback channel for reporting to the macro BS 210 can be transmitted together with the reference channel information received from the macro BS 210 in the second step.

In exemplary embodiments of the present disclosure, the uplink channels of the MS A 231 and the MS B 232 can be provided by the BS which provides the downlink channels. That is, the small cell BS 220 provides the uplink channel of the MS A 231, and the macro BS 210 provides the uplink channel of the BS B 232 in FIG. 2. Alternatively, the uplink channels of the MS A 231 and the MS B 232 can be established with the small cell BS 220, regardless of the downlink channels. That is, the entity providing the uplink channel can differ from the entity providing the downlink channel.

Figure 3:
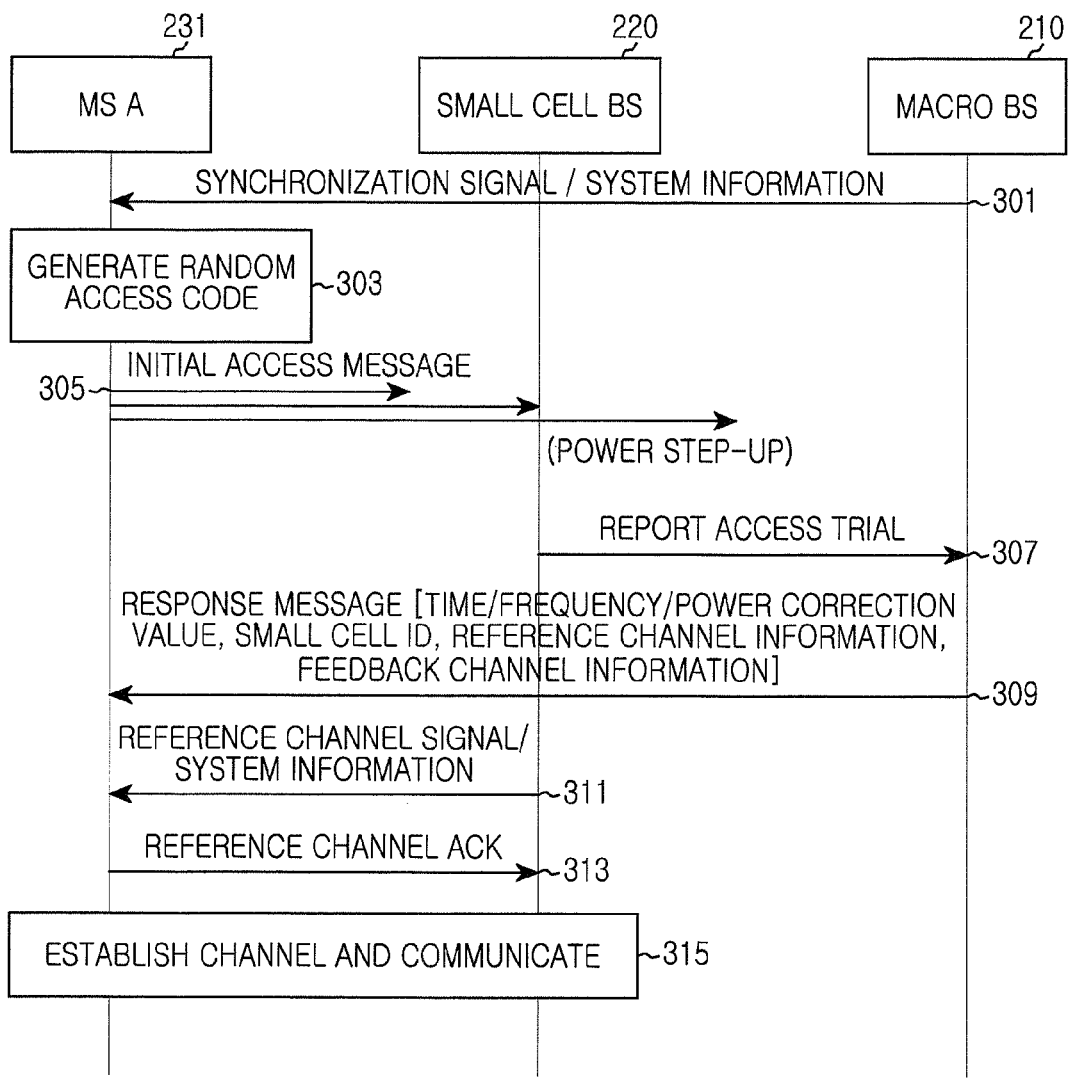
FIG. 3 illustrates signal exchanges when downlink access to a small cell is successful in the wireless communication system according to an exemplary embodiment of the present disclosure.

FIG. 3 depicts signal exchanges when the downlink access to the small cell is successful in the wireless communication system according to an exemplary embodiment of the present disclosure.

In step 301, the macro BS 210 transmits a synchronization signal and system information. The synchronization signal is periodically transmitted over a synchronization channel, and can be referred to as a preamble. In the frame, the location of the synchronization channel is predefined. For example, the synchronization channel is at the head of the frame. The system information is periodically transmitted at a predefined location as well, and can be referred to as a superframe header or a System Information Block (SIB). The synchronization signal and the system information are broadcast to all of the MSs. Using the synchronization signal, the MS A 231 can obtain downlink synchronization of the macro BS 210, and obtain cell identification information. Using the downlink synchronization and the cell identification information, the MS A 231 can receive the system information.

In step 303, the MS A 231 receiving the synchronization signal and the system information of the macro BS 210 generates a random access code. That is, the MS A 231 generates the random access code for the initial access. The initial access is carried out based on a random access scheme. For example, the random access code can be one code selected from a predefined code set.

In step 305, the MS A 231 transmits the initial access message including the random access code. That is, the MS A 231 transmits a random access message for the initial access. Since the MS A 231 attempting the initial access cannot know the distance to the macro BS 210, the MS A 231 repeatedly transmits the initial access message gradually increasing the power from the low power. As a result, the small cell BS 220 which is relatively closer receives the initial access message of the MS A 231 before the macro BS 210.

In step 307, the small cell BS 220 receiving the initial access message of the MS A 231 notifies the initial access message reception to the macro BS 210. That is, the small cell BS 220 reports the initial access trial to the macro BS 220. The report on the initial access trial can include the uplink time/frequency synchronization and the power correction information. The correction information can include the correction values of the transmit timing/frequency and power of the MS A 231.

In step 309, the macro BS 210 receiving the report of the initial access trial from the small cell BS 220 transmits a response message for the MS A 231. Herein, the response message includes the uplink time/frequency synchronization and the power correction information between the MS A 231 and the small cell BS 220, the identification information of the small cell BS 220, and the reference channel information of the small cell BS 220. The identification information of the small cell BS 220 can include an identifier (ID) of the small cell BS 220. The reference channel information can be the transmission point of the reference channel and the index of the reference channel. The response message can include the information of the feedback channel (e.g., the transmission time and location) for carrying the response indicating the decoding success or failure of the reference channel of the corresponding MS A 231. Herein, a recipient of the response indicating the decoding success or failure can include at least one of the small cell BS 220 and the macro BS 210. In so doing, the macro BS 210 may not identify the MS A 231. Thus, the macro BS 210 can transmit the response message after broadcasting resource allocation information for the response message, or transmit the response message using a predefined resource.

In step 311, the small cell BS 220 transmits a reference channel signal and the small cell BS's 220 system information over the reference channel. The reference channel signal enables the MS to determine whether the MS is in the cell of the small cell BS 220; that is, whether the MS can receive the downlink signal of the small cell BS 220. The reference channel signal can include the channel information required to communicate with the small cell BS 220 including the characteristic and system parameters of the small cell BS 220 and the location information of the control channels of the small cell BS 220.

In step 313, the MS A 231 receiving the response message attempts to decode the reference channel and succeeds in decoding. Hence, the MS A 231 decoding the reference channel signal and the system information transmits reference channel ACK to the small cell BS 220. That is, the MS A 231 receives and forwards the reference channel signal to the small cell BS 220. Although it is not depicted in FIG. 3, the small cell BS 220 can report the reception of the reference channel ACK to the macro BS 210. In so doing, the MS A 231 confirms the feedback channel to transmit the reference channel ACK using the feedback channel information received in step 309 and contained in the response message, and transmits the reference channel ACK. In FIG. 3, the recipient of the reference channel ACK is the small cell BS 220. Alternatively, the recipient of the reference channel ACK can be the macro BS 210, or both of the macro BS 210 and the small cell BS 220. In FIG. 3, the reference channel ACK is transmitted as the explicit signal. Alternatively, unlike the physical signal transmitted in FIG. 3, the reference channel ACK can be implicitly notified without transmitting any signal.

In step 315, the MS A 231 and the small cell BS 220 set the channel of the MS A 231, and the MS A 231 communicates via the small cell BS 220. Herein, the channel includes at least one of the downlink channel and the uplink channel.

Figure 4:
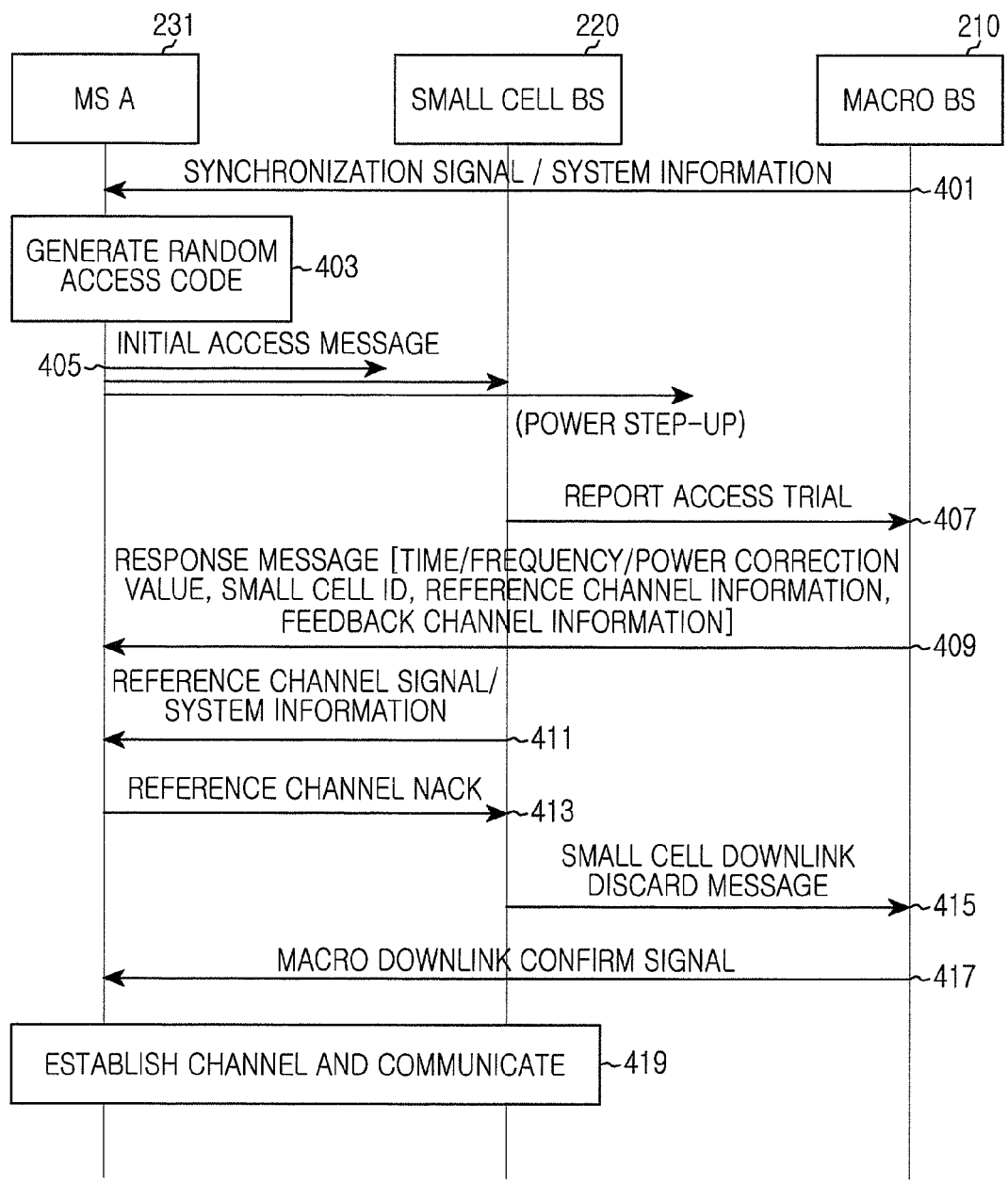
FIG. 4 illustrates signal exchanges when the downlink access to the small cell fails in the wireless communication system according to an exemplary embodiment of the present disclosure.
Figure 5:
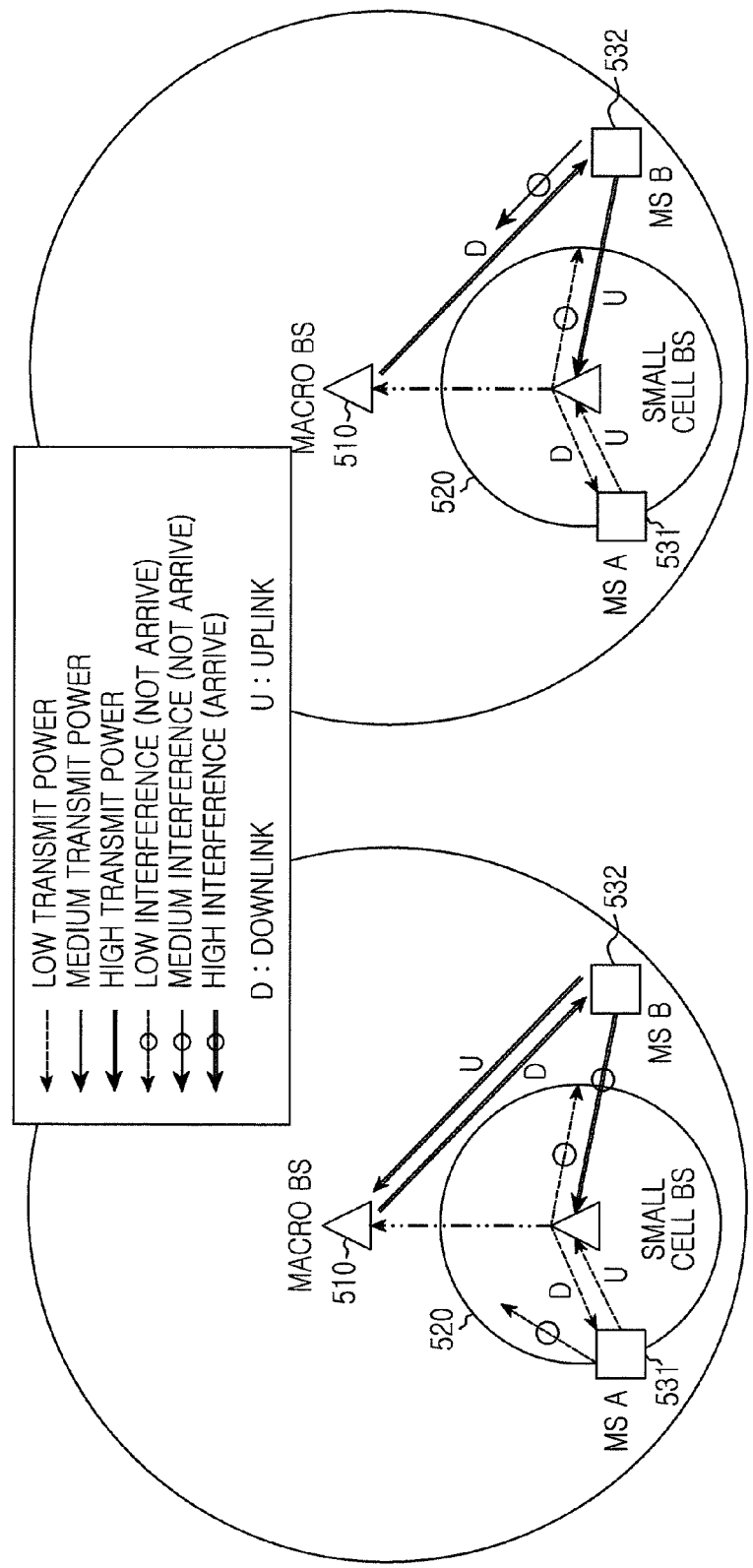
FIGS. 5A and 5B illustrate power save and interference mitigation in the wireless communication system according to an exemplary embodiment of the present disclosure.

FIG. 4 illustrates signal exchanges when the downlink access to the small cell fails in the wireless communication system according to an exemplary embodiment of the present disclosure.

In step 401, the macro BS 210 transmits the synchronization signal and the system information. The synchronization signal is periodically transmitted over the synchronization channel, and can be referred to as the preamble. In the frame, the location of the synchronization channel is predefined. For example, the synchronization channel is at the head of the frame. The system information is periodically transmitted at a predefined location as well, and can be referred to as the superframe header or the SIB. The synchronization signal and the system information are broadcast to all of the MSs. Using the synchronization signal, the MS B 232 can obtain the downlink synchronization of the macro BS 210, and obtain the cell identification information. Using the downlink synchronization and the cell identification information, the MS B 232 can receive the system information.

In step 403, the MS B 232 receiving the synchronization signal and the system information of the macro BS 210 generates the random access code. That is, the MS B 232 generates the random access code for the initial access. The initial access is carried out based on the random access scheme. For example, the random access code can be one code selected from a predefined code set.

In step 405, the MS B 232 transmits the initial access message including the random access code. That is, the MS B 232 transmits the random access message for the initial access. Since the MS B 232 attempting the initial access cannot know the distance to the macro BS 210, the MS B 232 repeatedly transmits the initial access message by gradually increasing the power from the low power. As a result, the small cell BS 220 which is relatively closer receives the initial access message of the MS B 232 before the macro BS 210.

In step 407, the small cell BS 220 receiving the initial access message of the MS B 232 notifies the initial access message reception to the macro BS 210. That is, the small cell BS 220 reports the initial access trial to the macro BS 220. The report on the initial access trial can include the uplink time/frequency synchronization and the power correction information. The correction information can include the correction values of the transmit timing/frequency and power of the MS B 232.

In step 409, the macro BS 210 receiving the report of the initial access trial transmits a response message for the MS B 232. Herein, the response message includes the uplink time/frequency synchronization and the power correction information between the MS B 232 and the small cell BS 220, the identification information of the small cell BS 220, and the reference channel information of the small cell BS 220. The identification information of the small cell BS 220 can include the ID of the small cell BS 220. The reference channel information can include the index and the transmission time of the channel. The response message can further include ranging correction information and the system information of the macro BS 210. The response message can include the information of the feedback channel (e.g., the transmission time and location) for the MS B 232 to transmit the response indicating the decoding success or failure of the reference channel. Herein, the recipient of the response indicating the decoding success or failure can include at least one of the small cell BS 220 and the macro BS 210. In so doing, the macro BS 210 may not identify the MS B 232. Thus, the macro BS 210 can transmit the response message after broadcasting the resource allocation information for the response message, or transmit the response message using a predefined resource.

In step 411, the small cell BS 220 transmits the reference channel signal and the small cell BS's 220 system information over the reference channel. The reference channel signal enables the MS to determine whether the MS is in the cell of the small cell BS 220; that is, whether the MS can receive the downlink signal of the small cell BS 220. The reference channel signal can include the channel information required to communicate with the small cell BS 220 including the characteristic and system parameters of the small cell BS 220 and the location information of the control channels of the small cell BS 220.

In step 413, the MS B 232 receiving the response message attempts to decode the reference channel and fails the decoding. Hence, the MS B 232 transmits the reference channel NACK to the small cell BS 220. That is, the MS B 232 informs the small cell BS 220 of no reception of the reference channel signal. In so doing, the MS B 232 identifies the feedback channel for carrying the reference channel NACK using the feedback channel information, which is received in step 409, of the response message. In FIG. 4, the recipient of the reference channel NACK is the small cell BS 220. Alternatively, the recipient of the reference channel NACK can be the macro BS 210, or both of the macro BS 210 and the small cell BS 220. In FIG. 4, the reference channel NACK is transmitted as the explicit signal. Alternatively, unlike the physical signal transmitted in FIG. 4, the reference channel NACK can be implicitly notified without transmitting any signal.

In step 415, the small cell BS 220 receiving the reference channel NACK transmits a small cell downlink discard message to the macro BS 210. That is, the small cell BS 220 reports the reception of the reference channel NACK to the macro BS 210. The small cell downlink discard message notifies that the MS B 232 leaves the downlink cell of the small cell BS 220. As mentioned earlier, the recipient of the reference channel NACK can include the macro BS 210 in step 413. In this example, the macro BS 210 recognizes based on the reference channel NACK that the MS B 232 cannot receive the downlink signal of the small cell BS 220. Hence, step 415 can be omitted.

In step 417, the macro BS 210 recognizing that the MS B 232 cannot receive the downlink signal of the small cell BS 220, transmits a macro downlink confirm signal. The macro downlink confirm signal is a message for confirming the downlink service initiation of the macro BS 210 to the MS B 232. That is, the MS B 232 recognizes that the macro BS 210 commences the downlink service. FIG. 4 depicts the macro downlink confirm signal as an independent message. Alternatively, the macro downlink confirm signal can be added to MAP information of the macro BS 210 or a signal according to the initial access transmitted to the MS B 232. Alternatively, step 417 can be omitted.

In step 419, the MS B 232 and the macro BS 210 set the downlink channel of the MS B 232, and the MS B 232 conducts the downlink communication via the macro BS 210. The MS B 232 sets the uplink channel with the macro BS 210 and conducts the uplink communication via the macro BS 210. Alternatively, the uplink channel can be provided by the small cell BS 220, regardless of the downlink channel.

As such, the system can determine whether the MS can receive the downlink signal of the small cell BS, and determine the node for managing the downlink channel of the MS. In so doing, when the uplink channel is established with the small cell BS regardless of the downlink channel, the saved power and the cancelled uplink interference of the MS can be achieved. FIGS. 5A and 5B illustrate the power saving and the interference mitigation in the wireless communication system according to an exemplary embodiment of the present disclosure. FIG. 5A depicts that the macro BS establish both of the uplink channel and the downlink channel, and FIG. 5B depicts that the small cell BS establishes the uplink channel and the macro BS establishes the downlink channel.

Referring to FIG. 5A, a small cell BS 520 provides the downlink channel and the uplink channel of an MS A 531. Hence, both of a. downlink signal and an uplink signal of the MS A 531 use low transmit power. Consequently, the MS A 531 is not subject to uplink interference and downlink interference. By contrast, a macro BS 510 provides the downlink channel and the uplink channel of an MS B 532. Hence, both of a downlink signal and an uplink signal of the MS B 532 use high transmit power. Consequently, the MS B 532 causes great uplink interference.

Referring to FIG. 5B, the small cell BS 520 provides the downlink channel and the uplink channel of the MS A 531. Hence, both of the downlink signal and the uplink signal of the MS A 531 use low transmit power. Consequently, the MS A 531 does not cause the uplink interference and the downlink interference. By contrast, the small cell BS 520 provides the downlink channel of the MS B 532, and the macro BS 510 provides the uplink channel. Hence, the downlink signal of the MS B 532 uses high transmit power, and the uplink signal uses medium transmit power. Unlike FIG. 5A, the uplink signal of the MS B 532 does not act as the uplink interference to the macro BS 510.

Now, operations and structures of the MS, the small cell BS, and the macro BS for processing the initial access procedure are explained in detail by referring to the drawings.

Figure 6:
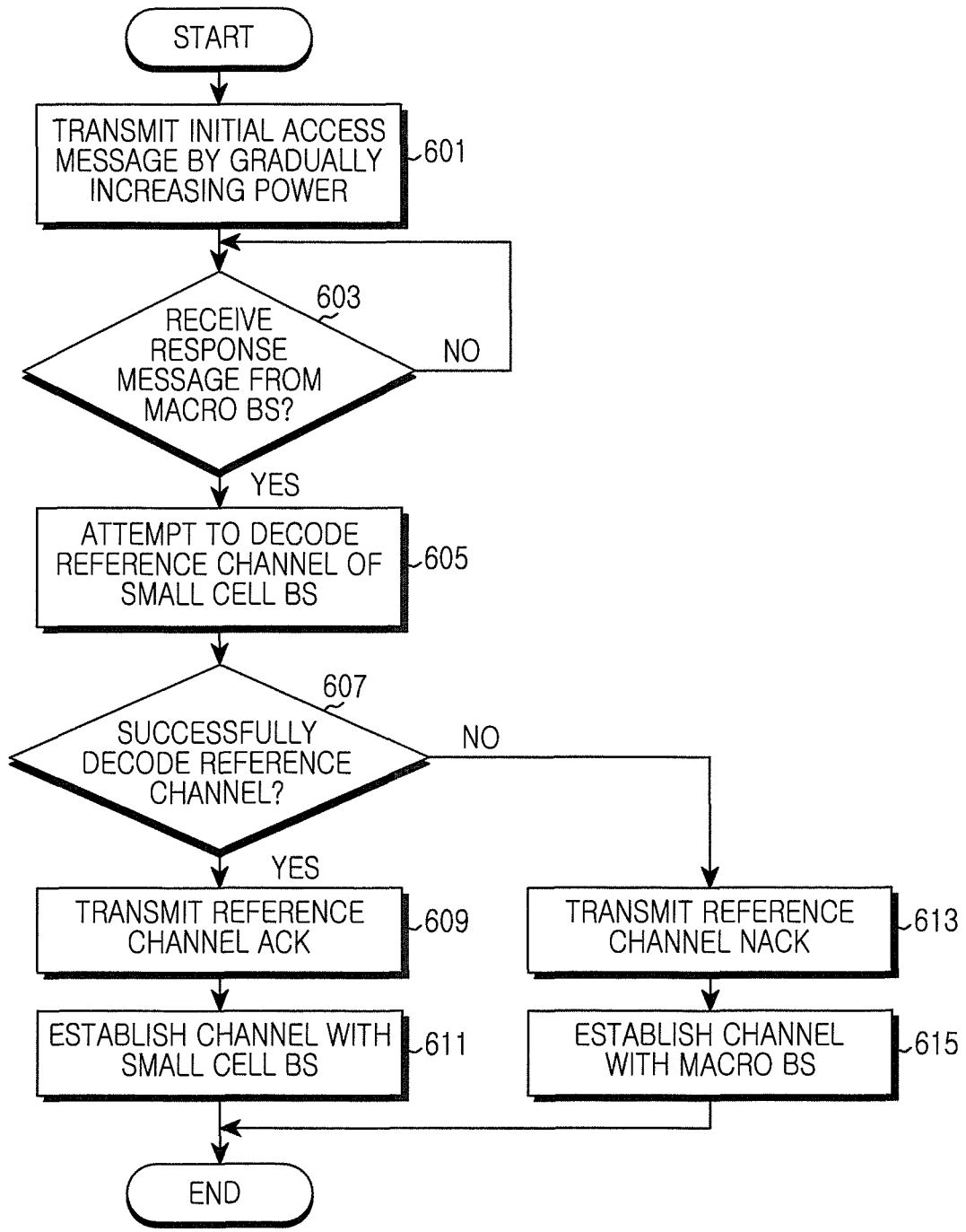
FIG. 6 illustrates operations of a mobile station in the wireless communication system according to an exemplary embodiment of the present disclosure.

FIG. 6 illustrates operations of the MS in the wireless communication system according to an exemplary embodiment of the present disclosure.

In step 601, the MS transmits the initial access message by gradually increasing the power. The transmission of the initial access message is repeated until the power reaches a maximum level or the response message is received in step 603. Herein, the initial access message can include the random access code. Although it is not depicted in FIG. 6, the MS can obtain the frame synchronization from the synchronization signal received from the macro BS before transmitting the initial access message, and obtain the system information received from the macro BS.

In step 603, the MS determines whether the response message is received from the macro BS. Herein, the response message can include at least one of the uplink time/frequency synchronization and the power correction information between the MS and the small cell BS, the identification information of the small cell BS, the reference channel information of the small cell BS, and the feedback channel information for informing of the decoding success or failure of the reference channel. The reference channel information can include the index and the transmission point of the channel. How to receive the response message can vary according to the implementation. For example, the MS can receive the response message after confirming the broadcast resource allocation information for the response message, or receive the response message using the predefined resource.

Upon receiving the response message, the MS attempts to decode the reference channel of the small cell BS in step 605. The reference channel is the channel for the MS to determine whether the MS can receive the downlink signal of the small cell BS. The signal type transmitted over the reference channel can vary according to the implementation. For example, the reference channel signal can be a predefined physical sequence. The MS can attempt to decode the reference channel through correlation. Alternatively, the reference channel signal can include a message of certain information. In this example, the MS can attempt to decode the reference channel through demodulation and decoding. Although it is not depicted in FIG. 6, the MS attempts to receive the system information of the small cell BS. For example, the system information can be part of the reference channel signal. The system information can be received separately from the reference channel signal.

In step 607, the MS determines whether the decoding of the reference channel is successful. For example, when the reference channel signal is the physical sequence, the MS determines whether a result value of the correlation is greater than a threshold. When the reference channel sequence is the message including the certain information, the MS determines whether error occurs using Cyclic Redundancy Check (CRC).

When the decoding is successful, the MS transmits the reference channel ACK in step 609. In other words, the MS notifies the successful decoding of the reference channel to the small cell BS. Alternatively, the recipient of the reference channel ACK can be the macro BS, or both of the macro BS and the small cell BS. In step 611, the MS sets the downlink channel and the uplink channel with the small cell BS. That is, the MS signals to set the downlink/uplink channels with the small cell BS.

When the decoding fails, the MS transmits the reference channel NACK in step 613. In other words, the MS notifies the decoding failure of the reference channel to the small cell BS. Alternatively, the recipient of the reference channel NACK can be the macro BS, or both of the macro BS and the small cell BS. In step 615, the MS sets the downlink channel and the uplink channel with the macro BS. That is, the MS signals to set the downlink/uplink channels with the small cell BS. Before setting the downlink channel, the MS can receive the message for setting the downlink channel with the macro BS, from the macro BS, which is not illustrated in FIG. 6.

In FIG. 6, the uplink channel and the downlink channel are provided from the same BS. Alternatively, the uplink channel can be provided from the small cell BS, regardless of the downlink channel. That is, the decoding failure of the reference channel merely implies that the MS cannot receive the downlink signal of the small cell BS, and the uplink signal of the MS is received at the small cell BS. Hence, the small cell BS can provide the uplink channel. In this example, in step 615, the MS can set only the downlink channel with the macro BS, and further set the uplink channel with the small cell BS.

In FIG. 6, the reference channel ACK and the reference channel NACK are transmitted as the explicit messages. Alternatively, the MS can transmit only one of the reference channel ACK and the reference channel NACK as the explicit signal, and notify the other implicitly without transmitting any signal.

Figure 7:
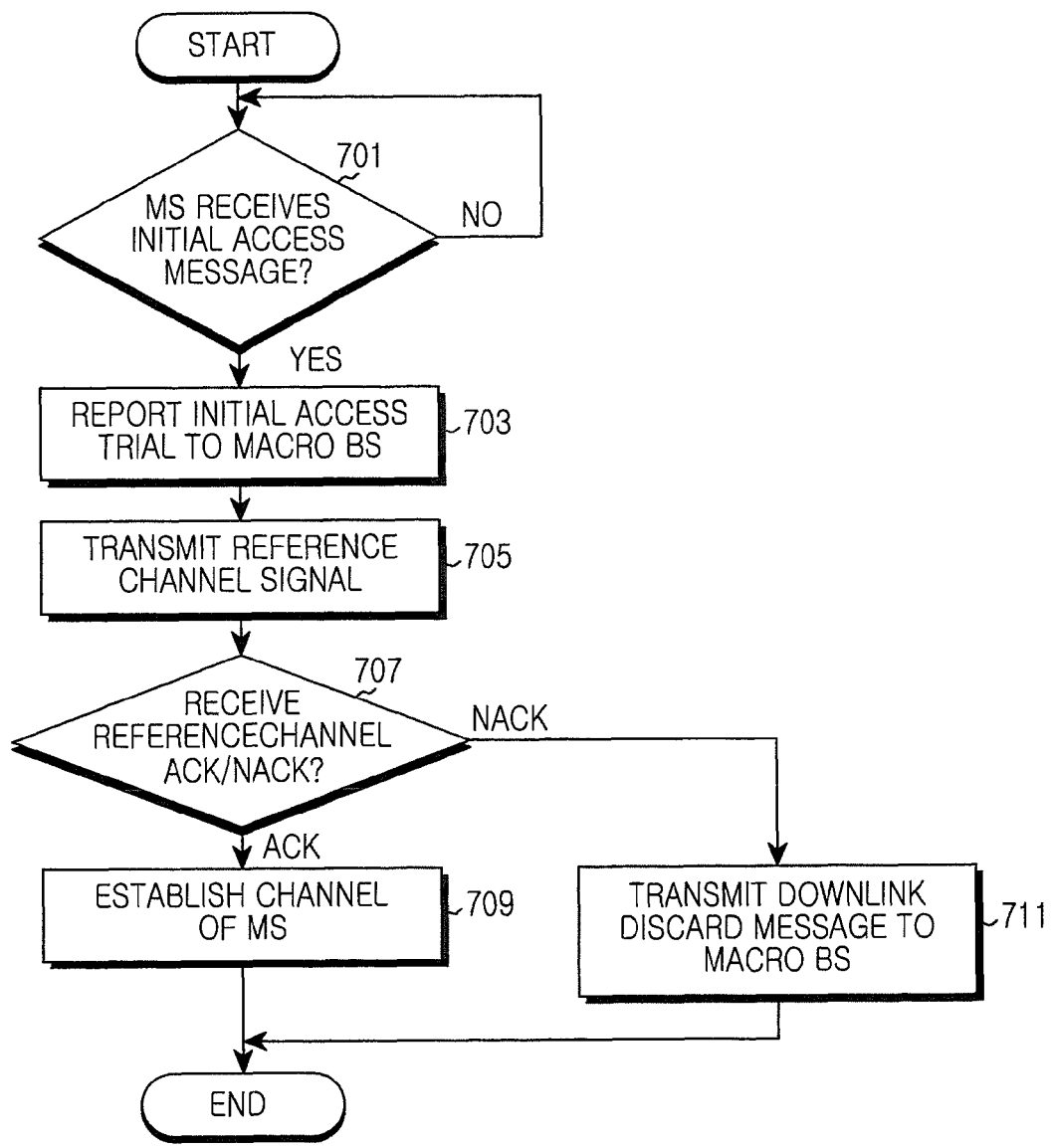
FIG. 7 illustrates operations of a small cell base station in the wireless communication system according to an exemplary embodiment of the present disclosure.

FIG. 7 illustrates operations of the small cell BS in the wireless communication system according to an exemplary embodiment of the present disclosure.

In step 701, the small cell BS determines whether the initial access message is received from the MS. The initial access message can include the random access code. Since the initial access message is received over the channel at the predefined position in the frame, the small cell BS can determine whether the initial access message is received by monitoring the signal received over the channel. For example, the initial access message can be detected through the correlation.

Upon receiving the initial access message, the small cell BS reports the initial access trial to the macro BS in step 703. That is, the small cell BS reports of the initial access message received. Herein, the report of the initial access trial can include the uplink time/frequency synchronization and the power correction information.

In step 705, the small cell BS transmits the reference channel signal. The reference channel is the channel for the MS to determine whether the MS can receive the downlink signal of the small cell BS. The signal type transmitted over the reference channel can vary according to the implementation. For example, the reference channel signal can be a predefined physical sequence. Alternatively, the reference channel signal can include the message of certain information. Although it is not depicted in FIG. 7, the small cell BS transmits the small cell BS's system information BS. For example, the system information can be part of the reference channel signal. The system information can be transmitted separately from the reference channel signal.

In step 707, the small cell BS determines whether the reference channel ACK or the reference channel NACK is received from the MS. That is, the small cell BS determines whether the signal indicating the decoding success or failure of the reference channel is received from the MS.

Upon receiving the reference channel ACK, the small cell BS sets the downlink channel and the uplink channel of the MS in step 709. The reception of the reference channel ACK indicates that the MS successfully decodes the reference channel, and implies that the MS can receive the downlink signal of the small cell BS. Hence, the small cell BS provides the downlink channel of the MS. That is, the small cell BS signals to establish the uplink/uplink channels of the MS. Although it is not depicted in FIG. 7, the small cell BS can report the reception of the reference channel ACK to the macro BS.

When receiving the reference channel NACK, the small cell BS transmits the small cell downlink discard message to the macro BS in step 711. That is, the small cell BS reports the reception of the reference channel NACK to the macro BS. The reception of the reference channel NACK indicates that the MS fails to decode the reference channel, and implies that the MS cannot receive the downlink signal of the small cell BS. Hence, the small cell BS reports no downlink channel provided to the MS.

In FIG. 7, the small cell BS does not provide the uplink channel to the MS which cannot decode the reference channel. Alternatively, the uplink channel can be provided by the small cell BS, regardless of the downlink channel. That is, the decoding failure of the reference channel merely implies that the MS cannot receive the downlink signal of the small cell BS, and the uplink signal of the MS is received at the small cell BS. Hence, the small cell BS can provide the uplink channel. In this example, after step 711, the small cell BS can further set the uplink channel with the MS.

Figure 8:
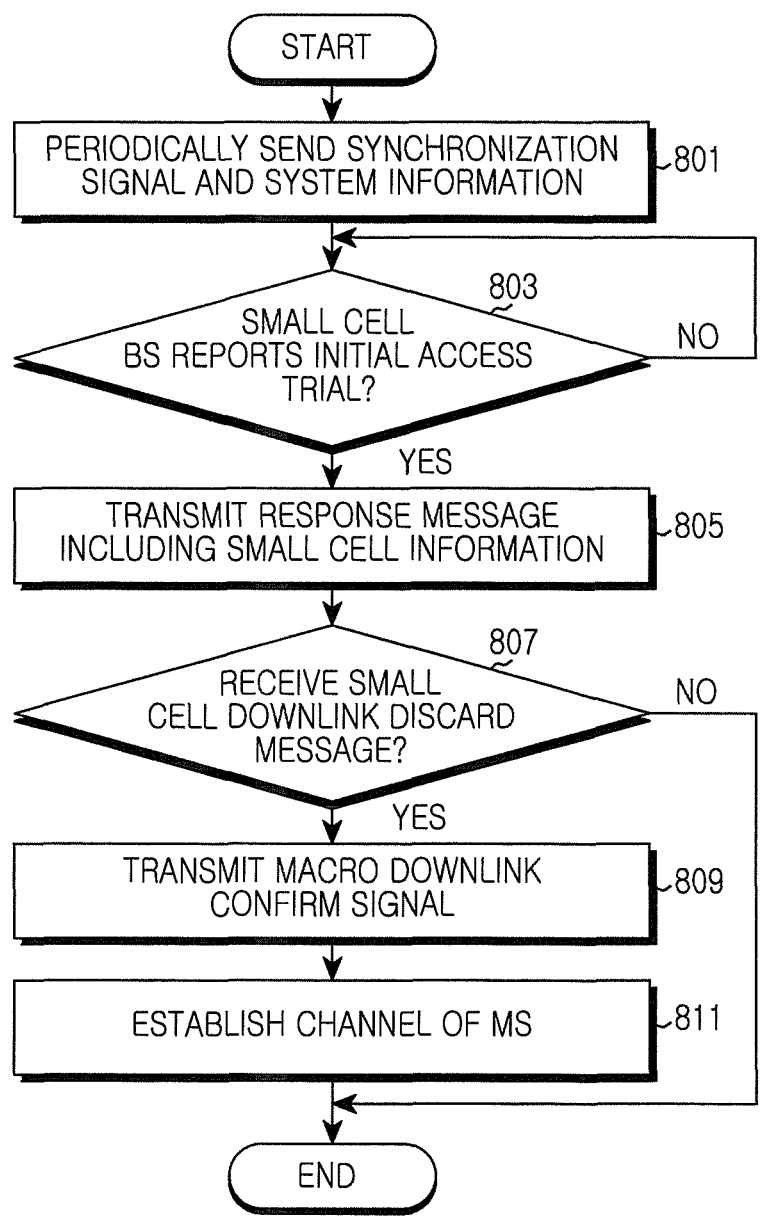
FIG. 8 illustrates operations of a macro base station in the wireless communication system according to an exemplary embodiment of the present disclosure.

FIG. 8 illustrates operations of the macro BS in the wireless communication system according to an exemplary embodiment of the present disclosure.

In step 801, the macro BS periodically transmits the synchronization signal and the system information. The synchronization signal is periodically transmitted over the synchronization channel, and can be referred to as the preamble. In the frame, the location of the synchronization channel is predefined. For example, the synchronization channel is at the very front of the frame. The system information is also periodically transmitted at the predefined location, and can be referred to as the superframe header or the SIB. The synchronization signal and the system information can be broadcast to all of the MSs. Step 801 can be steadily carried out separately from the operations of the macro BS.

In step 803, the macro BS determines whether the initial access trial is reported from the small cell BS. That is, the macro BS determines whether the small cell BS reports the reception of the initial access message. Herein, the report on the initial access trial can include the uplink time/frequency synchronization and the power correction information.

When the initial access trial is reported, the macro BS transmits the response message including the small cell information in step 805. Herein, the response message can include at least one of the uplink time/frequency synchronization and the power correction information between the MS and the small cell BS, the identification information of the small cell BS, the reference channel information of the small cell BS, and the feedback channel information informing of the decoding success or failure of the reference channel. The reference channel information can include the index and the transmission point of the channel. How to transmit the response message can vary according to the implementation. For example, the macro BS can transmit the response message after broadcasting the resource allocation information for the response message. Alternatively, the macro BS can transmit the response message using the predefined resource.

In step 807, the macro BS determines whether the small cell downlink discard message is received from the small cell BS. That is, the macro BS checks whether the report that the small cell BS cannot provide the downlink channel to the corresponding MS is received. When not receiving the small cell downlink discard message, the macro BS finishes this process.

By contrast, upon receiving the small cell downlink discard message, the macro BS transmits the macro downlink confirm signal in step 809. That is, the macro BS informs the MS that the macro BS provides the downlink channel. For example, the macro BS can transmit the macro downlink confirm signal after broadcasting the resource allocation information for the macro downlink confirm signal. Alternatively, the macro BS can transmit the macro downlink confirm signal using a predefined resource.

In step 811, the macro BS sets the downlink channel and the uplink channel of the MS. That is, the macro BS signals to establish the uplink/downlink channels of the MS. The reception of the small cell downlink discard message merely implies that the MS cannot receive the downlink signal of the small cell BS, and the small cell BS receives the uplink signal of the MS. Thus, the macro BS provides only the downlink channel of the MS. Alternatively, the MS can set the uplink channel with the node providing the downlink channel. In this example, the BS can establish the uplink channel of the MS in step 811.

In FIG. 8, the BS provides the downlink channel and the uplink channel to the MS which fails to decode the reference channel of the small cell BS. Alternatively, the small cell BS can provide the uplink channel, regardless of the downlink channel. That is, the decoding failure of the reference channel merely implies that the MS cannot receive the downlink signal of the small cell BS, and the uplink signal of the MS is received at the small cell BS. Hence, the small cell BS can provide the uplink channel. In this example, after step 811, the macro BS can exclude the uplink channel establishment of the MS and establish only the downlink channel.

Figure 9:
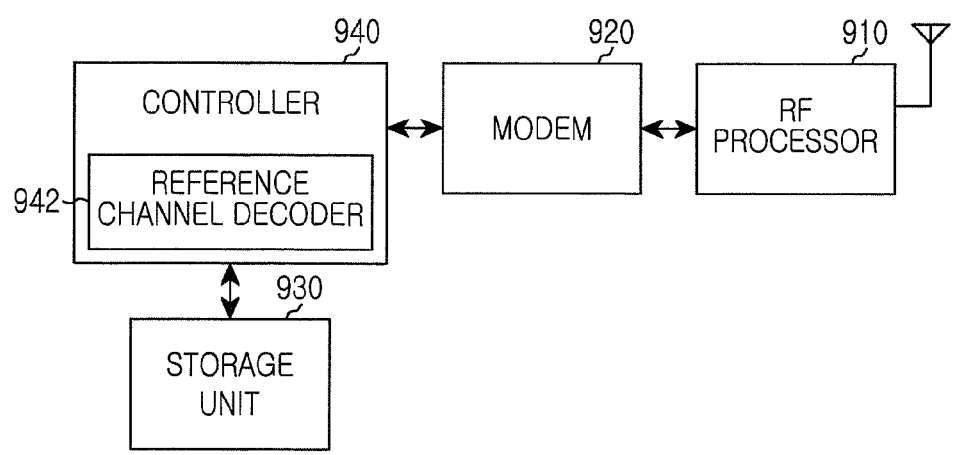
FIG. 9 illustrates the mobile station in the wireless communication system according to an exemplary embodiment of the present disclosure.

FIG. 9 illustrates a block diagram of the MS in the wireless communication system according to an exemplary embodiment of the present disclosure.

Referring to FIG. 9, the MS includes a Radio Frequency (RF) processor 910, a modem 920, a storage unit 930, and a controller 940.

The RF processor 910 transmits and receives signals over a radio channel through signal band conversion and amplification. That is, the RF processor 910 up-converts a baseband signal output from the modem 920 to an RF signal, transmits the RF signal via an antenna, and down-converts an RF signal received via the antenna to a baseband signal. For example, the RF processor 910 can include an amplifier, a mixer, an oscillator, a Digital to Analog Converter (DAC), and an Analog to Digital Converter (ADC).

The modem 920 converts the baseband signal and a bit stream according to a physical layer standard of the system. For example, according to the OFDM, for the data transmission, the modem 920 generates complex symbols by encoding and modulating the transmit bit stream, maps the complex symbols to subcarriers, and constitutes OFDM symbols by applying Inverse Fast Fourier Transform (IFFT) and inserting a Cyclic Prefix (CP). For the data reception, the modem 920 splits the baseband signal output from the RF processor 910 to OFDM symbols, restores the signals mapped to the subcarriers by applying FFT, and restores the receive bitstream by demodulating and decoding.

The storage unit 930 stores data such as basic program, application program, system configuration information., and user setting information to operate the MS. The storage unit 930 provides the stored data according to a request of the controller 940.

The controller 940 controls the functions of the MS. For example, the controller 940 generates and provides a transmit packet to the modem 920, and interprets a receive packet fed from the modem 920. The controller 940 controls the functions to perform the initial access procedure. For doing so, the controller 940 includes a reference channel decoder 942 for decoding the reference channel of the small cell BS. For example, the controller 940 controls the MS to operate as shown in FIG. 6.

For the initial access procedure, the controller 940 operates as below. The controller 940 controls the modem 920 and the RF processor 910 to transmit the initial access message by gradually increasing the power such as, for example, as described with regard to step 601 in FIG. 6. When receiving the response message including at least one of the identification information of the small cell BS receiving the initial access message, and the reference channel information of the small cell BS while repeatedly transmitting the initial access message, the reference channel decoder 942 attempts to decode the reference channel of the small cell BS. When successfully decoding the reference channel, the controller 940 transmits the reference channel ACK to the small cell BS via the modem 920 and the RF processor 910, and signals to establish the downlink channel with the small cell BS. By contrast, when failing to decode, the controller 940 transmits the reference channel NACK to the small cell BS via the modem 920 and the RF processor 910, and signals to establish the downlink channel with the macro BS. In so doing, before setting the downlink channel, the controller 940 can receive from the macro BS the message instructing to set the downlink channel with the macro BS. Next, the controller 940 signals to establish the uplink channel with the small cell BS. Alternatively, the controller 940 can set the uplink channel with the node which provides the downlink channel. When failing to decode the reference channel, the controller 940 signals to set the uplink channel with the macro BS.

Figure 10:
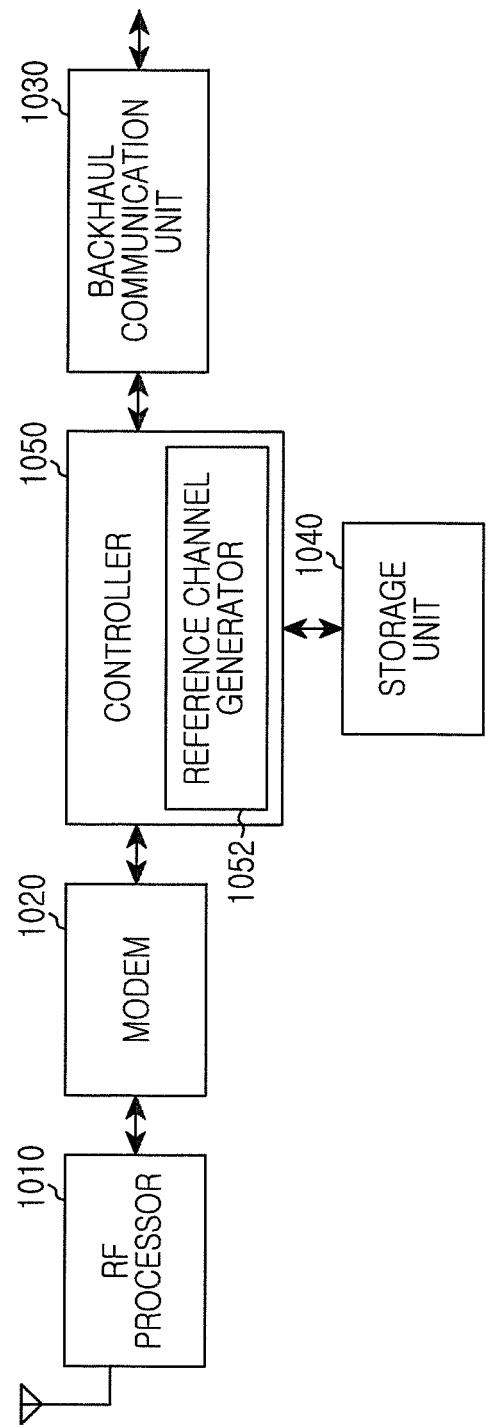
FIG. 10 illustrates the small cell base station in the wireless communication system according to an exemplary embodiment of the present disclosure.

FIG. 10 illustrates a block diagram of the small cell BS in the wireless communication system according to an exemplary embodiment of the present disclosure.

The small cell BS includes an RF processor 1010, a modem 1020, a backhaul communication unit 1030, a storage unit 1040, and a controller 1050 as shown in FIG. 10.

The RF processor 1010 transmits and receives signals over a radio channel through the signal band conversion and amplification. That is, the RF processor 1010 up-converts a baseband signal output from the modem 1020 to an RF signal, transmits the RF signal via an antenna, and down-converts an RF signal received via the antenna to a baseband signal. For example, the RF processor 1010 can include an amplifier, a mixer, an oscillator, a DAC, and an ADC.

The modem 1020 converts the baseband signal and a bit stream according to the physical layer standard of the system. For example, according to the OFDM, for the data transmission, the modem 1020 generates complex symbols by encoding and modulating the transmit bit stream, maps the complex symbols to subcarriers, and constitutes OFDM symbols by applying the IFFT and inserting a CP. For the data reception, the modem 1020 splits the baseband signal output from the RF processor 1010 to OFDM symbols, restores the signals mapped to the subcarriers by applying the FFT, and restores the receive bitstream by demodulating and decoding.

The backhaul communication unit 1030 provides an interface for the small cell BS to communicate with other nodes; for example, with the macro BS. That is, backhaul communication unit 1030 converts the bit stream transmitted from the small cell BS to the other node, to the physical signal, and converts the physical signal received from the other node to the bit stream. The storage unit 1040 stores data such as basic program, application program, and system configuration information to operate the small cell BS. The storage unit 1040 provides the stored data according to a request of the controller 1050.

The controller 1050 controls the functions of the small cell BS. For example, the controller 1050 generates and provides a transmit packet to the modem 1020 or the backhaul communication unit 1030, and interprets a receive packet fed from the modem 1020 or the backhaul communication unit 1030. In particular, the controller 1050 controls to perform the initial access procedure with the MS. For doing so, the controller 1050 includes a reference channel generator 1052 for generating the reference channel signal. For example, the controller 1050 controls the small cell BS to operate as shown in FIG. 7.

For the initial access procedure, the controller 1050 operates as follows. When receiving the initial access message from the MS, the controller 1050 reports the initial access trial to the macro BS, and transmits the reference channel signal and the system information of the small cell. Herein, the report on the initial access trial can include the uplink time/frequency synchronization and the power correction information. Next, when receiving the reference channel ACK from the MS, the controller 1050 signals to set the downlink channel of the MS. By contrast, when receiving the reference channel NACK, the controller 1050 reports the reception of the small cell downlink discard message; that is, the reference channel NACK to the macro BS. Next, the controller 1050 signals to set the uplink channel of the MS. Alternatively, the MS can set the uplink channel with the node providing the downlink channel. When the reference channel NACK is received, the signaling for setting the uplink channel can be omitted.

Figure 11:
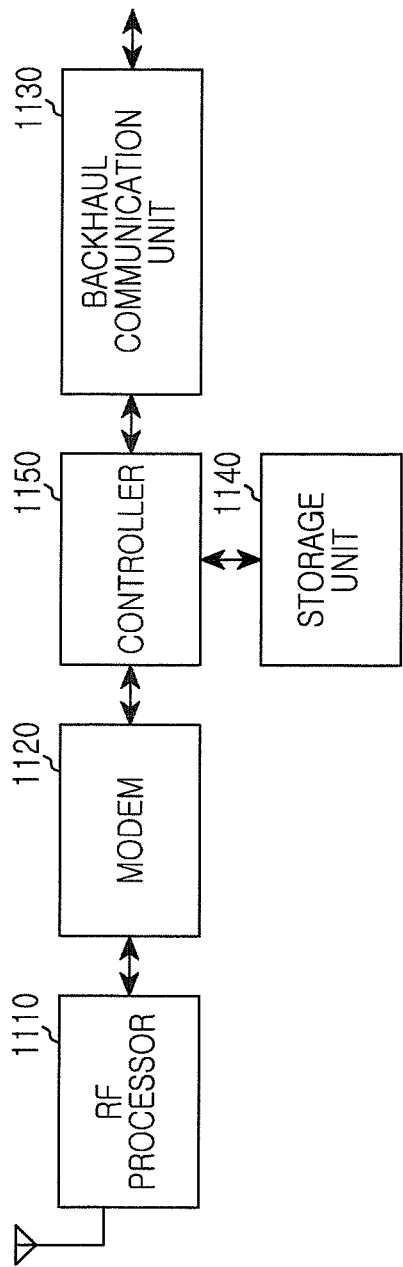
FIG. 11 illustrates the macro base station in the wireless communication system according to an exemplary embodiment of the present disclosure.

FIG. 11 illustrates a block diagram of the macro BS in the wireless communication system according to an exemplary embodiment of the present disclosure.

The macro BS includes an RF processor 1110, a modem 1120, a backhaul communication unit 1130, a storage unit 1140, and a controller 1150 as shown in FIG. 11.

The RF processor 1110 transmits and receives signals over a radio channel through the signal band conversion and the amplification. That is, the RF processor 1110 up-converts a baseband signal output from the modem 1120 to an RF signal, transmits the RF signal via an antenna, and down-converts an RF signal received via the antenna to a baseband signal. For example, the RF processor 1110 can include an amplifier, a mixer, an oscillator, a DAC, and an ADC.

The modern 1120 converts the baseband signal and a bit stream according to the physical layer standard of the system. For example, according to the OFDM, for the data transmission, the modem 1120 generates complex symbols by encoding and modulating the transmit bit stream, maps the complex symbols to subcarriers, and constitutes OFDM symbols by applying the IFFT and inserting a CP. For the data reception, the modem 1120 splits the baseband signal output from the RF processor 1110 to OFDM symbols, restores the signals mapped to the subcarriers by applying the FFT, and restores the receive bitstream by demodulating and decoding.

The backhaul communication unit 1130 provides an interface for the macro BS to communicate with other nodes; for example, with the small cell BS. That is, the backhaul communication unit 1130 converts a bit stream transmitted from the macro BS to the other node, to a physical signal, and converts a physical signal received from the other node to a bit stream. The storage unit 1140 stores data such as basic program, application program, and system configuration information to operate the macro BS. The storage unit 1140 provides the stored data according to a request of the controller 1150.

The controller 1150 controls the functions of the macro BS. For example, the controller 1150 generates and provides a transmit packet to the modem 1120 or the backhaul communication unit 1130, and interprets a receive packet fed from the modem 1120 or the backhaul communication unit 1130. The controller 1150 periodically transmits the synchronization signal and the system information such as, for example, as described with regard to step 801 in FIG. 8. In particular, the controller 1150 controls to perform the initial access procedure of the MS. For example, the controller 1150 controls the macro BS to operate as shown in FIG. 8.

For the initial access procedure, the controller 1150 operates as follows. When receiving the report of the initial access trial from the small cell BS via the backhaul communication unit 1130, the controller 1150 transmits the response message including the small cell information through the modem 1120 and the RF processor 1110. Herein, the response message includes the identification information of the small cell BS and the reference channel information of the small cell BS. Next, when receiving the small cell downlink discard message via the backhaul communication unit 1130, the controller 1150 transmits the macro downlink confirm signal through the modem 1120 and the RF processor 1110; that is, informs the corresponding MS that the macro BS will provide the downlink channel. Next, the controller 1150 signals to set the downlink channel of the MS. Alternatively, the MS sets the uplink channel with the node providing the downlink channel. In so doing, the controller 1150 can signal to establish the downlink channel and the uplink channel of the MS.

As set forth above. the entity for providing the downlink channel of the MS is determined using the reference channel of the small cell BS in the wireless communication system. Thus, the optimum node can provide the downlink channel to the MS. Further, since the entities for providing the uplink channel and the downlink channel are separated, the uplink interference can be mitigated and the power consumption of the MS can be reduced.

While the invention has been shown and described with reference to certain exemplary embodiments thereof, it will be understood by those skilled in the art that various changes in foul' and details may be made therein without departing from the spirit and scope of the invention as defined by the appended claims and their equivalents.

What is claimed is:

1. A method for a mobile station (MS), the method comprising:
   receiving, from a macro base station (BS), a message comprising information regarding a small BS;
   receiving a first signal from the small BS;
   transmitting an acknowledge (ACK) for the first signal to the small BS; and
   receiving a second signal for establishing a downlink channel with the small BS from the small BS.

2. The method of claim 1, wherein the message comprises at least one of identification information of the small BS, information of a reference channel, information of decoding success or failure of the reference channel, time/frequency synchronization between the MS and the small BS, and power correction information.

3. The method of claim 1, further comprising:
   in response to a failure to receive the first signal from the small BS, receiving a third signal, from the macro BS, for establishing a downlink channel with the macro BS.

4. The method of claim 3, further comprising:
   in response to a failure to receive the first signal, transmitting a non-acknowledge (NACK) for the first signal to the small BS.

5. The method of claim 4, further comprising:
   receiving, from the macro BS, a signal informing that the macro BS provides the downlink channel to the MS.

6. The method of claim 1, further comprising:
   receiving a system information from the small BS.

7. A method for a small base station (BS), the method comprising:
   receiving a random access code from a mobile station (MS);
   transmitting a first report indicating an initial access trial of the MS to a macro BS;
   transmitting a first signal for determining whether to provide a downlink channel to the MS; and
   receiving an acknowledge (ACK) for the first signal from the MS.

8. The method of claim 7, further comprising:
   if the ACK is not received, transmitting a second report informing that the MS fails to receive the first signal, to the macro BS.

9. The method of claim 8, further comprising:
   establishing an uplink channel with the MS.

10. The method of claim 7, wherein the first report comprises at least one of uplink time/frequency synchronization and power correction information of the MS.

11. The method of claim 7, further comprising:
    transmitting a second signal for establishing the downlink channel for the MS.

12. A method for a macro base station (BS), the method comprising:
    receiving, from a small BS, a first report indicating an initial access trial of a mobile station (MS);
    transmitting, to the MS, a message comprising information of the small BS;
    receiving, from the small BS, a second report indicating that the MS has failed to receive a first signal from the small BS; and
    transmitting, to the MS, a second signal indicating that the macro BS is configured to provide a downlink channel to the MS.

13. The method of claim 12, wherein the message comprises at least one of identification information of the small BS, information of a reference channel, information of decoding success or failure of the reference channel, time/frequency synchronization between the MS and the small BS, and power correction information.

14. The method of claim 12, further comprising:
    establishing the downlink channel for the MS.

15. An apparatus of a mobile station (MS), the apparatus comprising:
    a receiver configured to:
        receive, from a macro base station (BS), a message comprising information regarding a small BS, and
        receive a first signal from the small BS; and
    a transmitter configured to transmit an acknowledge (ACK) for the first signal,
    wherein the receiver is further configured to receive a second signal for establishing a downlink channel with the small BS from the small BS.

16. The apparatus of claim 15, wherein the message comprises at least one of identification information of the small BS, information of a reference channel, information of decoding success or failure of the reference channel, time/frequency synchronization between the MS and the small BS, and power correction information.

17. The apparatus of claim 15, wherein, in response to a failure to receive the first signal from the small BS, the receiver is further configured to receive a third signal from the macro BS for establishing a downlink channel with the macro BS.

18. The apparatus of claim 17, wherein, in response to a failure to receive the first signal, the transmitter is further configured to transmit a non-acknowledge (NACK) for the first signal to the small BS.

19. The apparatus of claim 18, wherein the receiver is further configured to receive, from the macro BS, a signal informing that the macro BS provides the downlink channel to the MS.

20. The apparatus of claim 15, wherein the receiver is further configured to receive a system information from the small BS.

21. An apparatus of a small base station (BS), the apparatus comprising:

a receiver configured to receive a random access code from a mobile station (MS);

a backhaul communication unit configured to transmit a first report indicating an initial access trial of the MS to a macro BS; and a transmitter configured to transmit a first signal for determining whether to provide a downlink channel to the MS, wherein the receiver is further configured to receive an acknowledge (ACK) for the first signal from the MS.

22. The apparatus of claim 21, wherein, if the ACK is not received, the backhaul communication unit is further configured to transmit a second report informing that the MS fails to receive the first signal to the macro BS.

23. The apparatus of claim 22, further comprising:

a controller configured to establish an uplink channel for the MS.

24. The apparatus of claim 21, wherein the first report comprises at least one of uplink time/frequency synchronization of the MS and power correction information.

25. The apparatus of claim 21, wherein the transmitter is further configured to a second signal for establishing the downlink channel for the MS.

26. An apparatus of a macro base station (BS), the apparatus comprising:

a backhaul communication unit configured to receive, from a small BS, a first report indicating an initial access trial of a mobile station (MS); and a transmitter configured to transmit, to the MS, a message comprising information of the small BS, wherein the backhaul communication unit is further configured to receive, from the small BS, a second report indicating that the MS has failed to receive a first signal from the small BS, wherein the transmitter is further configured to transmit, to the MS, a second signal indicating that the macro BS is configured to provide a downlink channel to the MS.

27. The apparatus of claim 26, wherein the message comprises at least one of identification information of the small BS, information of a reference channel, information of decoding success or failure of the reference channel, time/frequency synchronization between the MS and the small BS, and power correction information.

28. The apparatus of claim 26, further comprising:

a controller configured to establish the downlink channel for the MS.

* * * * *